Aug. 4, 1964

C. L. BOSSARD 3,143,731

DIGITAL ENCODER

Filed Dec. 28, 1960

INVENTOR.
CHARLES L. BOSSARD

BY [signature]

ATTORNEY

United States Patent Office 3,143,731

Patented Aug. 4, 1964

3,143,731

DIGITAL ENCODER

Charles L. Bossard, Perkasie, Pa., assignor to the United States of America as represented by the Secretary of the Navy Filed Dec. 28, 1960, Ser. No. 79,086
5 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

This invention relates to a position encoder and more particularly to a device which transforms the position of a body directly into a digital code.

Various old methods for transforming the position of a shaft or a body into a digital code are present in the art. One of the most common methods employs a primary detector which converts the position of a body into an analog voltage. This type of device necessarily involves the use of some kind of analog-to-digital converter. In many cases some form of intermediate amplification is also necessary. Another system presently used to obtain a digital code from positional information is a frequency-digital type system consisting of a detector, an oscillator, and an electronic counter, and which measures the phase difference between a reference voltage generator and a voltage generated by the body the position of which is to be encoded. Various other methods exist for converting shaft or body positions into digital form, many of which require and incorporate analog-to-digital conversion systems. All of the old systems require various complex subcomponents for extracting position information in a digital form.

These old methods are complex and introduce unavoidable inaccuracies due to their complexity.

This invention contemplates a device by which the linear position of a body is converted directly into a digital form or code which is immediately and continuously available for any contemplated use, for example, for direct indication of position, for the control of the body, or for immediate insertion into a computer. The present invention eliminates the need of an analog-to-digital converter between the information source and the output of coded pulses. This elimination reduces the size and cost of position encoders and it also greatly reduces the complexity of such systems which alone lessens the probability of error.

This invention utilizes as its basic concept the converse Weidman magnetic effect which says that when the magnetic state of a twisted magnetically permeable wire is changed, an electrical pulse is generated between the ends or intermediate portions of the wire. In this invention a number of magnetically permeable wires are twisted and secured in a matrix. As a strong magnetic field associated with an armature is passed by the ends of the wires, each wire will in turn be changed in magnetic state and a pulse will appear between the ends of the wire.

An object of the present invention is to provide a position encoder system in which position information is converted directly into digital form.

Another object of the present invention is to provide a position encoder system which eliminates an analog-to-digital converter as an intermediate component.

A further object of the invention is the provision of a position encoder for transforming position information into digital form in which the information is immediately and continuously available in digital code which may be inserted directly into a computer.

Another object of the invention is the provision of a rugged, simple, more compact apparatus for converting body position directly into a digital code.

With these and other objects in view as will hereinafter more fully appear and which will be more particularly pointed out in the appended claims, reference is now made to the following description taken in connection with the accompanying drawings in which:

Figure 1:
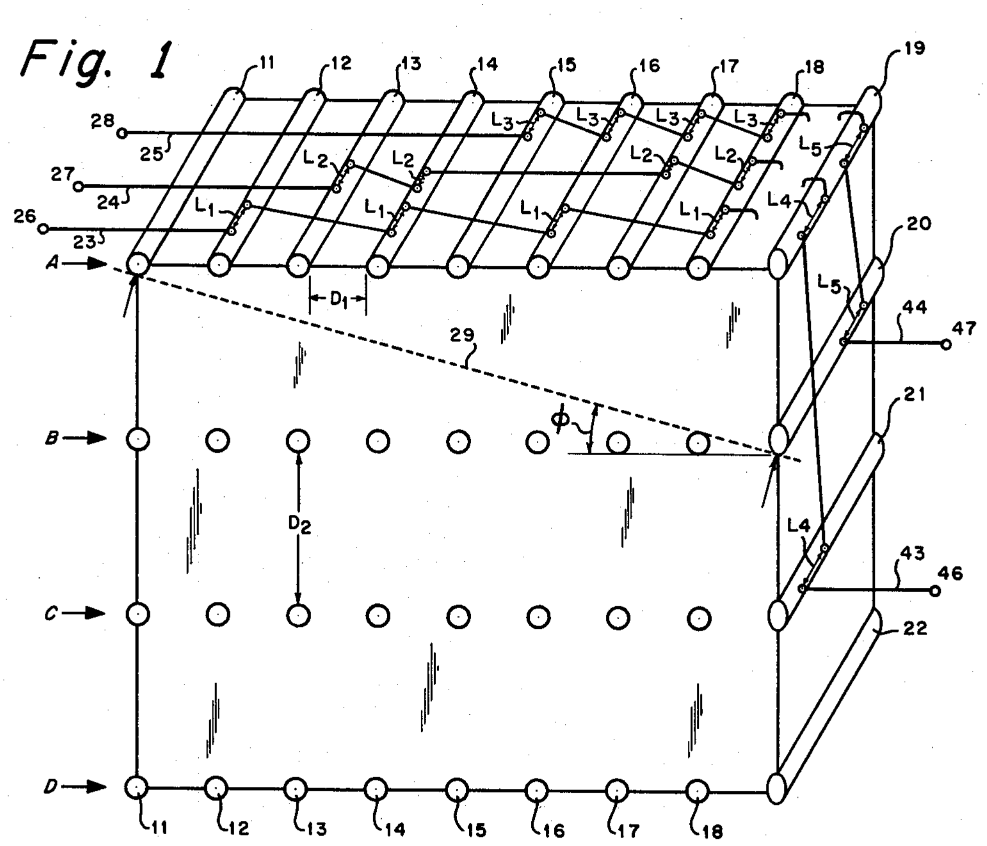
FIG. 1 is a pictorial view of the matrix of wires of this invention.

FIG. 1 shows the matrix having four rows A, B, C, and D of eight wires, 11 through 18. Each wire is twisted a predetermined amount and fixedly secured in parallel relationship to all the other wires in the matrix. The wires in each row are separated from one another by a distance $d_1$ while the rows are separated from each other by a distance $d_2$ which may be equal to or greater than the distance $d_1$. The distance between rows and rods is maintained fixed, which may be accomplished by embedding the wires or potting the wires in an epoxy resin or the like. All the rods are of equal length and their adjacent ends shown form along with the embedding material a common planar face in which the ends are themselves exposed.

Each of the rows of wires A, B, C, and D may contain an additional wire 19, 20, 21, and 22, respectively, of oval shape which together form a column.

Each of the wires in the matrix is of a magnetically permeable material and, as has been previously pointed out, are twisted a predetermined amount along their longitudinal axis and fixedly secured within the imbedding material under a torsional force. According to the converse Weidman effect, wires are magnetically permeable material which have been twisted will produce a voltage pulse between their ends and within intermediate lengths of the wire when a magnetic field strong enough to change the magnetic state of the wire is brought into proximity with the wire. This effect is employed to advantage in this invention and forms a basis thereof.

Looking at row A of the wires it is seen that there are three conductors 23, 24 and 25 having output terminals 26, 27 and 28, respectively, which are electrically associated with the wires and utilize portions of the wires in forming a continuous conducting path for each of the conductors. Conductor 23 skips wire 11 of row 8 and connects to wire 12 and uses a length $L_1$ of wire 12 as part of its conductive path. Conductor 23 then continues on and skips wire 13 to connect to wire 14 in a manner duplicating the connection in wire 12. Conductor 23 continues this pattern throughout the rest of row A and without a break repeats the pattern in each of rows B, C, and D. Conductor 23 finally terminates at a common point or ground. It may be seen that if a magnetic field strong enough to change the magnetic state of the wires which form part of the conductive path of conductor 23 is brought near any one of those wires, that particular wire whose state is changed causes a voltage pulse to be induced within the length $L_1$ of the wire and this voltage pulse will appear at output terminal 26.

Conductor 27 follows a pattern similar to that of conductor 23, but in the case of conductor 24 it skips two wires and connects to two wires in a repeating fashion throughout all the rows A, B, C, and D with lengths $L_2$ forming part of the conducting path of conductor 24. A conductor 24 finally terminates at a common point or ground. Likewise conductor 25 follows a pattern similar to conductors 23 and 24, and utilizes lengths $L_3$ as part its conductive path. Conductor 25, however, skips four wires at a time and connects to the next following four wires. This pattern is continued on through all of the rows A, B, C and D and conductor 25 finally terminates in a common point or ground.

Figure 2:
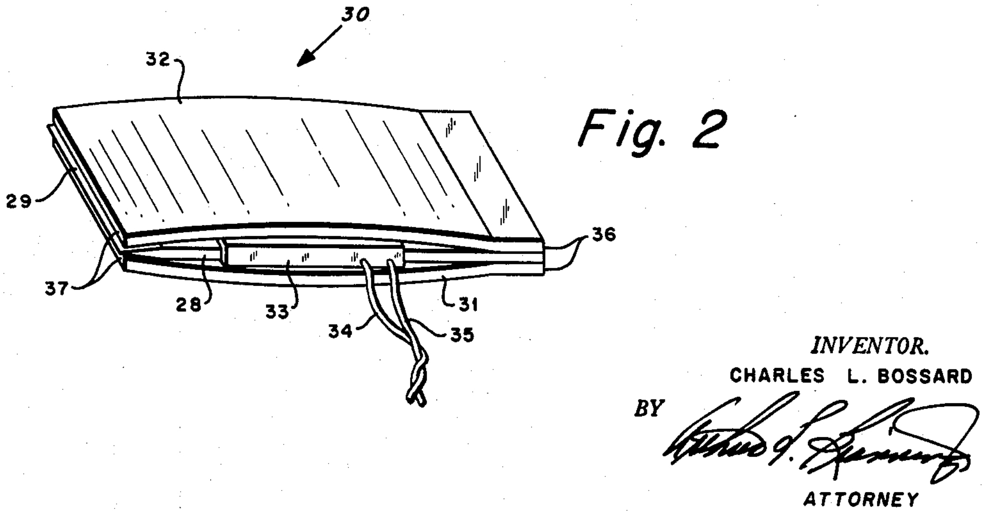
FIG. 2 is a view of the armature used in this invention.

FIG. 2 shows the armature 30 having a core 28 of magnetically permeable material terminating at one end into a knife edge 29. The core 28 is wound with a coil 33 having terminals 34 and 35 by which the coil 33 may be energized to produce a concentrated magnetic field about the knife edge 29. Flux guides 31 and 32 composed of a magnetically permeable material are mechanically and magnetically secured to the core 28 at their adjacent ends 36 in any convenient manner such as by welding. The knife edge 29 of the core 28 protrudes slightly beyond the other of the adjacent ends 37 of the guides 31 and 32. There is an air gap between each of the ends 37 and the core 28 in the vicinity of the knife edge so that when the coil 33 is energized by alternating current, a magnetic field will be produced about knife edge 29 and concentrated thereabout. The flux guides 31 and 32 serve to limit the area encompassed by the magnetic field and by virtue of their low reluctance return any excess field back through the core 28.

At this point, for purposes of explanation, only row A will be considered, since rows B, C, and D are each duplicates of row A. Consider a point source of magnetic flux strong enough to change the magnetic state of each of the wires in row A as it passes the wires 11–18 in row A. When the source reaches a certain point near wire 11 the magnetic state of wire 11 will be changed, but since wire 11 has no conductor tied to it, no pulse will appear on any of output terminals 26, 27 and 28. When the source of magnetic flux is moved to a position near wire 12 the magnetic state of that wire will be changed and a pulse will be produced within the length $L_1$. This pulse will appear at output terminal 26. Since wire 12 has no similar connections for conductors 24 and 25, output terminals 27 and 28 will not have a pulse. Therefore, when a pulse appears on terminal 26 and there is no pulse on output terminals 27 and 28, it is known that the magnetic flux source is in the specific area of wire 12. Similarly, when the source of magnetic flux is in the specific area of wire 13, a pulse is produced within the length $L_2$ and the pulse appears on output terminal 27. At the same time there is no pulse on output terminals 26 and 28 and from this information on output terminals 26, 27 and 28 it is correctly concluded that the source of magnetic flux is in the specific area of rod 13. When a pulse appears on output terminals 26 and 27 and at the same time no pulse appears on output terminal 28 it will be clear that the source of magnetic flux is in the specific area of wire 14. Thus, each wire which represents a position, when it is changed in magnetic state by the magnetic field, will cause a particular combination of pulses, no-pulses to appear on output terminals 26, 27 and 28. The output on each of the terminals 26, 27 and 28 for each individual wire is tabulated below where a pulse condition is indicated by "1" and a no-pulse condition is indicated by a "0":

| Wire | Output Terminals | | |
|---|---|---|---|
| | 26 | 27 | 28 |
| 11 | 0 | 0 | 0 |
| 12 | 1 | 0 | 0 |
| 13 | 0 | 1 | 0 |
| 14 | 1 | 1 | 0 |
| 15 | 0 | 0 | 1 |
| 16 | 1 | 0 | 1 |
| 17 | 0 | 1 | 1 |
| 18 | 1 | 1 | 1 |

As can be seen by inspection of the above table, each series of pulse, no-pulse associated with each wire is in a binary code. Thus, each position of the magnetic field with respect to the wires has its own discrete digital form which is immediately available on the terminals 26, 27 and 28.

Line 29 represents the knife edge 29 of armature 30 in FIG. 2. The knife edge 29 of armature 30 sweeps past the planar face of the matrix at an angle $\phi$ with the horizontal. The armature 30 is, of course, attached to the body about which position information is desired. As the knife edge starts sweeping the planar face beginning in row D with wire 11, every rod in that particular row will be swept one at a time producing a discrete series of output pulses or no pulses on output terminals 26, 27 and 28 which fully identifies the wire which at that moment is being passed by the knife edge 29. However, as the knife edge 29 passes all the wires in a particular row such as row D, and then starts to sweep past the individual wires in row C there would be no way of telling which row A, B, C or D the knife edge 29 was sweeping at a particular time. The column formed by the additional wires 19, 20, 21, and 22 in each row A, B, C and D is incorporated into the system for overcoming this problem.

The wires 19, 20, 21 and 22 are similar in construction to the rods 11 through 18 of the rows A, B, C and D. However, the rods 19 through 22 are oval shaped, as shown in the drawing, to insure that while the knife edge 29 is sweeping a particular row it remains in close proximity to the end of a particular one of wires 19, 20, 21 and 22. The wires 19 through 22 have associated with them conductors 43 and 44 which are similar in configuration to conductors 23, 24 and 25. Conductor 43, for example, skips wire 22, connects to wire 21, skips wire 20 and connects to wire 19 to length $L_4$ to form a part of the conductive path of conductor 43. One end of conductor 43 has an output terminal 46 while the other end terminates in a common point or ground. Conductor 44 skips wires 22 and 21 and connects to wire 20 then to wire 19, in which the length $L_5$ forms part of the conductive path of conductor 44. Conductor 44 has an output terminal 47 and its other end terminates in a common point or ground. Thus, as the knife edge of armature 30 slowly passes wire 21, for example, a pulse is produced within the length $L_4$ and appears on output terminal 46.

The operation of the position encoder will now be discussed starting with the knife edge 29 in the position as shown by dotted line in FIG. 1. As the body, the position of which is to be converted into a digital code is moved, the knife edge 29 starts passing the individual wires 11 through 18 of row A one at a time. At the same time, the end of wire 20 is being passed by the knife edge 29 and continues to be slowly passed throughout the time it takes for all the wires in row A to be passed by the knife edge 29. Thus, the fact that row A is being passed by the knife edge 29 is known by the absence of a pulse at output terminal 46 and the presence of a pulse on output terminal 47 at the moment knife edge 29 of armature 30 begins to pass wire 11 of row A. Thus, the row is identified. From then on the presence of an output or no output on output terminals 26, 27 and 28 will indicate the position of knife edge 29 in the already indicated row. The outputs which appear on the terminals 26, 27, 28, 46, and 47 as knife edge 29 is in the specific area of each wire 11–18 of row A may be tabulated as follows:

| Wire | Output Terminals | | | | |
|---|---|---|---|---|---|
| | 26 | 27 | 28 | 46 | 47 |
| 11 | 0 | 0 | 0 | 0 | 1 |
| 12 | 1 | 0 | 0 | 0 | 1 |
| 13 | 0 | 1 | 0 | 0 | 1 |
| 14 | 1 | 1 | 0 | 0 | 1 |
| 15 | 0 | 0 | 1 | 0 | 1 |
| 16 | 1 | 0 | 1 | 0 | 1 |
| 17 | 0 | 1 | 1 | 0 | 1 |
| 18 | 1 | 1 | 1 | 0 | 1 |

It should be obvious that such a tabulation could be formulated for each row A, C, C or D.

As can be seen from the tabulation of both sets of conductors it is a discrete group of pulses or no-pulses presented at the output terminals 26, 27 and 28, 46 and 47 for each wire 11–18 of each individual row A, B, C, and D. These outputs are in digital form and in fact are in a well known binary code form. Such a code form can be used to give facts, position information, continuously and immediately. This information may be used directly to indicate relative position of the body whose position is to be known or inserted directly into a computer.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A magnetic digital encoder for transforming the position of a movable body into a digital code, comprising in combination: a row of magnetically permeable wires fixedly secured in parallel relationship to one another with adjacent ends of said wires forming a common planar face, each of said wires being twisted about the longitudinal axes thereof, a plurality of conductors electrically associated with said wires and forming conductive paths with selected portions of said wires, an armature including means for producing a concentrated magnetic field therein, said armature being connected to said body to be movable thereby through a path adjacent said planar face whereby a pulse is produced in said selected portions of said wires as said armature moves along said path.

2. A magnetic digital encoder for transforming the portion of a movable body into a digital code, comprising in combination: a row of magnetically permeable wires fixedly secured in parallel relationship to one another with adjacent ends of said wires forming a common planar face, each of said wires being twisted about the longitudinal axes thereof, a plurality of conductors electrically associated with said wires and incorporating portions of selected ones of said wires in the conductive paths thereof, said plurality of conductors utilizing no two wires alike in the conductive paths thereof, an armature including means for producing a concentrated magnetic field therein, said armature being connected to said body for movement thereby through a path adjacent said planar face whereby a discrete series of pulses are produced in said plurality of conductors as said magnetic field moves past each of said wires along said path.

3. A magnetic digital encoder for transforming the position of a movable body into a digital code, comprising in combination: a row of magnetically permeable wires fixedly secured in parallel relationship to one another with adjacent ends of said wires forming a common planar face, each of said wires being twisted about the longitudinal axes thereof, a first conductor incorporating a portion of alternate ones of said wires in the conductive path thereof, a second conductor incorporating a portion of each one of alternate pairs of said wires in the conductive path thereof, a third conductor incorporating a portion of each one of alternate quadruplets of said wires in the conductive path thereof, each of said conductors having an output terminal at one end and a common connection at the other end thereof, an armature including means for producing a concentrated magnetic field therein, said armature being connected to said body to be movable thereby through a path adjacent said planar face whereby a discrete series of pulses appears at said output terminals as said armature moves past each of said wires along said path.

4. A magnetic digital encoder for transforming the position of a movable body into a digital code, comprising in combination: a plurality of rows of magnetically permeable wires fixedly secured in parallel relationship to one another with adjacent ends of said wires forming a common planar face, each of said wires being twisted about the longitudinal axes thereof, a first continuous conductor incorporating a portion of alternate ones of said wires in each of said rows in the conductive path thereof, a second continuous conductor incorporating a portion of each one of alternate pairs of said wires in each of said rows in the conductive path thereof, a third continuous conductor incorporating a portion of each one of alternate quadruplets of said wires in each of said rows in the conductive path thereof, an output terminal at one end of each of said conductors, a common connection at the other end of said conductors, an armature having an elongated knife edge including means for producing a concentrated magnetic field about said knife edge, means connecting said armature to said body to sweep said knife edge across said face at a predetermined angle passing one wire at a time whereby a discrete series of pulses appear in said output terminals as each of said wires is swept by said knife edge, means included in said rows and magnetically connected to said armature for identifying the particular row being swept by said armature.

5. A magnetic digital encoder for transforming the position of a movable body into a digital code, comprising in combination: a plurality of rows of magnetically permeable wires fixedly secured in parallel relationship to one another with adjacent ends of said wires forming a common planar face, each of said wires being twisted about the longitudinal axes thereof, a first plurality of continuous conductors, a first of said conductors incorporating a portion of alternate ones of said wires in each of said rows in the conductive path thereof, a second of said conductors incorporating a portion of each one of alternate pairs of said wires in each of said rows in the conductive path thereof, a third of said conductors incorporating a portion of each one of alternate quadruplets of said wires in each of said rows in the conductive path thereof, each of said conductors having an output terminal at one end and a common connection at the other end, an additional wire in each of said rows forming a column, a second plurality of continuous conductors, a first of said second plurality of conductors incorporating a portion of alternate ones of said wires in said column in the conductive path thereof, a second of said second plurality of conductors incorporating a portion of each one of alternate pairs of said wires in the conductive path thereof, each of said second plurality of conductors having an output terminal at one end and a common connection at the other end, an armature having an elongated knife edge including means for producing a concentrated magnetic field about said knife edge, means connecting said armature to said body to sweep said knife edge across said face at a predetermined angle passing one wire at a time whereby a discrete series of pulses appear in said output terminals as each of said wires is swept by said knife edge.

References Cited in the file of this patent

UNITED STATES PATENTS 2,931,023 Quade ---------------- Mar. 29, 1960